US011513518B2

(12) United States Patent
Caveney

(10) Patent No.: US 11,513,518 B2
(45) Date of Patent: Nov. 29, 2022

(54) AVOIDANCE OF OBSCURED ROADWAY OBSTACLES

(71) Applicant: Toyota Motor Engineering & Manufacturing North America, Inc., Plano, TX (US)

(72) Inventor: Derek S. Caveney, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 408 days.

(21) Appl. No.: 16/261,704

(22) Filed: Jan. 30, 2019

(65) Prior Publication Data

US 2020/0241530 A1 Jul. 30, 2020

(51) Int. Cl.
*G05D 1/00* (2006.01)
*G06N 5/04* (2006.01)
*G05D 1/02* (2020.01)
*B60W 60/00* (2020.01)
*G06V 20/58* (2022.01)

(52) U.S. Cl.
CPC ....... *G05D 1/0088* (2013.01); *B60W 60/0016* (2020.02); *G05D 1/0212* (2013.01); *G06N 5/04* (2013.01); *B60W 2554/4048* (2020.02); *G05D 1/0231* (2013.01); *G05D 1/0255* (2013.01); *G05D 1/0257* (2013.01); *G05D 1/0276* (2013.01); *G05D 2201/0213* (2013.01); *G06V 20/58* (2022.01)

(58) Field of Classification Search
CPC ............... G05D 1/0088; G05D 1/0212; G05D 2201/0213; G05D 1/0231; G05D 1/0255; G05D 1/0276; G05D 1/0257; G06N 5/04; G06K 9/00805; B60W 2554/4048; B60W 60/0015; B60W 60/0016; B60W 2554/4045; B60W 2556/20; B60W 2556/65
USPC .......................................................... 701/23
See application file for complete search history.

(56) References Cited

U.S. PATENT DOCUMENTS 7,508,321 B2    3/2009  Gueziec et al.
9,658,620 B1*   5/2017  Urmson ............. G06Q 30/0207
10,059,334 B1*  8/2018  Zhu .................... G08G 1/09623
(Continued)

FOREIGN PATENT DOCUMENTS

GB          2579023      * 10/2020   .......... B60W 30/165

*Primary Examiner* — Yazan A Soofi
(74) *Attorney, Agent, or Firm* — Christopher G. Darrow; Darrow Mustafa PC

(57) ABSTRACT

The systems and methods described herein disclose detecting obstacles in a vehicular environment using host vehicle input and associated trust levels. As described here, measured vehicles, either manual or autonomous, that detect an obstacle in the environment will operate to respond to the obstacle. As such, those movements can be used to determine if an obstacle exists in the environment, even if the obstacle cannot be detected directly. The systems and methods can include a host vehicle receiving prediction data about an evasive behavior from one or more measured vehicles in a vehicular environment. A trust level can then be established for the measured vehicles. An obscured obstacle can be determined using the evasive behavior and the trust level which can then be mapped in the vehicular environment. A guidance input can then be created for the host vehicle using the obscured obstacle and the trust level.

21 Claims, 6 Drawing Sheets

(56) References Cited

U.S. PATENT DOCUMENTS

| | | | |
|---|---|---|---|
| 10,074,279 B1* | 9/2018 | Xu | B60W 10/04 |
| 2007/0279250 A1* | 12/2007 | Kume | G08G 1/162 |
| | | | 340/903 |
| 2009/0004348 A1 | 1/2009 | Silva | |
| 2009/0015756 A1 | 1/2009 | Lee | |
| 2009/0043486 A1* | 2/2009 | Yang | G01C 21/3492 |
| | | | 701/117 |
| 2009/0157566 A1* | 6/2009 | Grush | G06Q 30/0283 |
| | | | 705/400 |
| 2013/0151058 A1* | 6/2013 | Zagorski | B60W 30/0956 |
| | | | 701/23 |
| 2013/0151088 A1 | 6/2013 | Ricci | |
| 2015/0266455 A1 | 9/2015 | Wilson | |
| 2016/0018954 A1 | 1/2016 | Park et al. | |
| 2016/0189544 A1* | 6/2016 | Ricci | G08G 1/096827 |
| | | | 701/117 |
| 2017/0291540 A1* | 10/2017 | Caveney | B60Q 5/005 |
| 2018/0186366 A1* | 7/2018 | Gordon | B60W 30/09 |
| 2018/0272975 A1* | 9/2018 | Zhu | G05D 1/0055 |
| 2018/0300964 A1* | 10/2018 | Lakshamanan | G01C 21/3492 |
| 2018/0314259 A1* | 11/2018 | Shami | B60W 50/14 |
| 2019/0278277 A1* | 9/2019 | Tao | B60W 60/0017 |
| 2019/0283757 A1* | 9/2019 | Honda | B60W 30/165 |
| 2020/0050195 A1* | 2/2020 | Gross | B60W 60/00272 |
| 2020/0130684 A1* | 4/2020 | Raichelgauz | B60W 60/0016 |
| 2020/0174493 A1* | 6/2020 | Lin | G05D 1/0088 |
| 2020/0193823 A1* | 6/2020 | Zhang | G08G 1/096791 |
| 2020/0241530 A1* | 7/2020 | Caveney | G05D 1/0088 |

\* cited by examiner

AVOIDANCE OF OBSCURED ROADWAY OBSTACLES

TECHNICAL FIELD

Implementations described herein generally relate to the navigation of vehicles. More specifically, the implementations generally relate to systems and methods of avoiding roadway hazards and other associated difficulties during driving.

BACKGROUND

Operation of a vehicle is part of everyday life in modern society. As such, drivers and autonomous vehicles can benefit from being aware of changes which occur to the roads. Roadways can often change for a vehicle operator. Over a period of days or hours, a road, or portions thereof, can go from being traversable to entering construction. Potholes and other roadway obstacles can appear over a matter of days or hours. Such obstacles can make otherwise traversable roads less drivable. Available signs and indications of roadway changes may be inadequate. Some roadway obstacles may not be addressed by signs or other available indications, due to the transient nature of the obstacle.

SUMMARY

Disclosed herein are systems and methods for detection of obscured roadway obstacles. In one or more implementations, an obstacle prediction system for vehicle-based obstacle prediction is disclosed. The obstacle prediction system can include one or more processors; and a memory communicably coupled to the one or more processors. The memory can further store an evaluation module including instructions that when executed by the one or more processors cause the one or more processors to receive, in a host vehicle, prediction data about an obscured obstacle and including observations from at least one sensor and communications from one or more measured vehicles in a vehicular environment, and establish a trust level for at least one of the one or more measured vehicles. The memory can further store an integrity module including instructions that when executed by the one or more processors cause the one or more processors to in response to predicting the obscured obstacle using the prediction data and the trust level, map the prediction in the vehicular environment. The memory can further store a coordination module including instructions that when executed by the one or more processors cause the one or more processors to navigate the host vehicle using a guidance input for avoiding the obscured obstacle.

In further implementations, a non-transitory computer-readable medium for vehicle-based obstacle prediction is disclosed. The non-transitory computer-readable medium can store instructions that when executed by one or more processors cause the one or more processors to receive, in a host vehicle, prediction data about an obscured obstacle and including observations from at least one sensor and communications from one or more measured vehicles in a vehicular environment. The non-transitory computer-readable medium can further store instructions to establish a trust level for at least one of the one or more measured vehicles. The non-transitory computer-readable medium can further store instructions to, in response to predicting the obscured obstacle using the prediction data and the trust level, map the prediction in the vehicular environment. The non-transitory computer-readable medium can further store instructions to navigate the host vehicle using a guidance input for avoiding the obscured obstacle.

In further implementations, a method for vehicle-based obstacle prediction is disclosed. The method can include receiving, in a host vehicle, prediction data about an obscured obstacle and including observations from at least one sensor and communications from one or more measured vehicles in a vehicular environment. The method can further include establishing a trust level for at least one of the one or more measured vehicles. The method can further include in response to predicting the obscured obstacle using the prediction data and the trust level, mapping the obscured obstacle in the vehicular environment. The method can further include navigating the host vehicle using a guidance input for avoiding the obscured obstacle.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1:
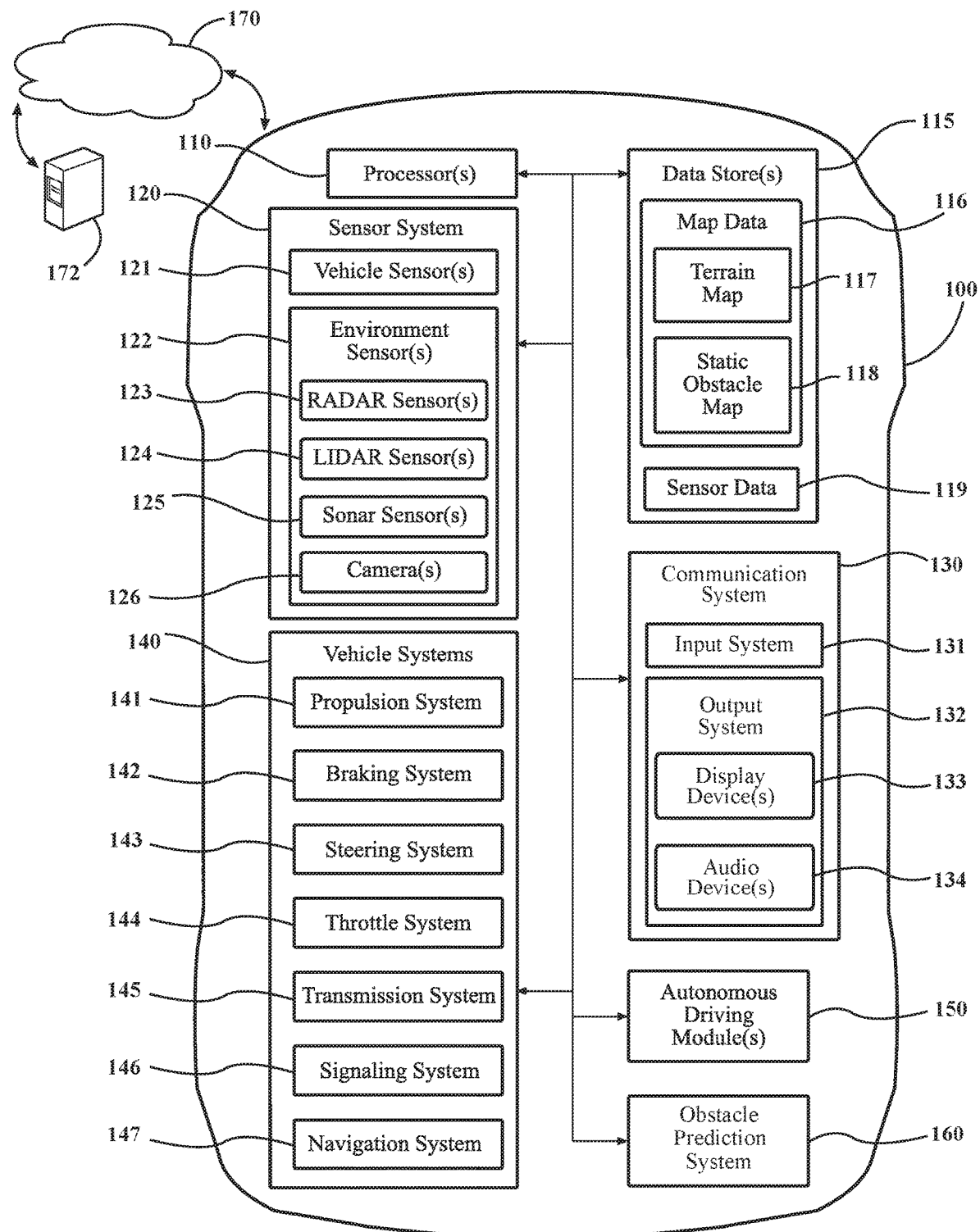
FIG. 1 is a block diagram of a vehicle usable as part of an obstacle prediction system, according to implementations described herein.

Systems and methods described herein use observations about a vehicular environment from one or more vehicles to determine the existence and location of obstacles which are outside of the detection range of one or more vehicle sensors. Modern automated vehicles, though adept at finding and maintaining a lane, can have a difficult time directly detecting obstacles which can affect the road, such as semi-truck tire scrap, automobile parts, and other small debris. Potholes and minor obstacles may be blocked by traffic, or they may just be too small or at the wrong angle to reflect radio waves to be quickly picked up by radar. The result is the vehicle will collide with the obstacle or pothole with no warning. Obstacle detection becomes particularly important in level 3 ("eyes off the road") autonomous implementations, where there is no human fail-safe mechanism.

The systems and methods described herein can provide information by leveraging observations about vehicle actions and patterns from one or more trusted measured vehicles in a vehicular environment. The measured vehicles are vehicles that produce one or more behaviors which are measured by a host vehicle. The host vehicle is a vehicle which detects the behaviors of the measured vehicles and incorporates or benefits from the systems and methods described herein. The collected information from the observations can be modeled to determine transient temporal aspects of the roadway, such as when lanes are restricted because of HOV requirements, the standard divergence of vehicles from a selected path, new obstacle formations, and so on. Moreover, the systems and methods also provide for data metrics about both vehicle trust and detected obstacles. The data metrics can include collecting information about the trustworthiness of an operator or a vehicle regarding reported obstacles, whether a lane is not traversable because of snow, an accident, or some other hazard, and updates to a vehicular environment map in real-time to reflect the condition.

The systems and methods described here can incorporate observations from a vehicle-based system about the movements and interactions of the one or more measured vehicles within the vehicular environment. The vehicle-based system, as stored locally in the host vehicle or remotely in a cloud storage device or combinations thereof, can collect data about the movements of the measured vehicles. The movements, which can include lane changes, deceleration, offset within a lane or others, can be determined to be avoidant behaviors of the measured vehicles. It is believed that there are signature characteristics about movements which relate them to avoidance, such as similar movements between multiple vehicles which are associated in space and time, abrupt movements, or other indicators which differentiate between standard movements and evasive behaviors. The systems and methods can then apply the movements involved in the evasive behaviors of the measured vehicles to the vehicular environment to determine factors about a possible obscured obstacle, such as size and positioning. As such, the systems and methods can use the evasive behaviors as predictive data for an obscured obstacle in the vehicular environment.

In implementations described herein, the systems and methods collect information about trust for the one or more measured vehicles and their behaviors within the vehicular environment. The system measures trust based on the reliability of the operator or the vehicle in a number of parameters. The systems and methods can measure trust based on how often the behaviors of the operator lead to a positive detection of an obscured obstacle. The obscured obstacle is a prediction of an obstacle in the vehicular environment based on information from one or more indirect sources. The systems and methods can further measure or determine trust generally, such as how often the actions of a specific vehicle lead to a positive detection of an obscured obstacle. The systems and methods can determine trust based on specific parameters, such as braking, steering, or navigation. Further, the system can relate trust to a specific environmental condition or a driving environment.

The trust of the one or more measured vehicles can be associated to the behavior as observed to determine the reliability of the avoidance behavior of the measured vehicle in the vehicular environment. The system and methods can apply trust levels as determined based on a short interval (e.g., during a specific driving interaction) or based on a history of interactions or behaviors (e.g., vehicle or operator history over an extended period of time). The systems and methods described here can use trust levels to determine how confident the host vehicle is that the behavior of the one or more measured vehicles is reliable in one or more ways. The system can apply the trust levels to increase or decrease the size of the prediction for the obscured obstacle. Thus, the systems and methods can scale and modify the associations of the evasive behaviors to one or more obscured obstacles affecting the drivability of a road.

These predictions of obscured obstacles can be applied to updating the navigation data for the host vehicle or secondary vehicles, such as through mapping of vehicle lanes including the appropriate placement of the obscured obstacle. Secondary vehicles, as used herein, are vehicles which can benefit from the systems and methods described herein, outside of the host vehicle and the one or more measured vehicles. In some implementations, the updated information can be presented to secondary vehicles as part of the systems or methods in a variety of ways. In some examples, the information can be presented by being pushed or uploaded to secondary vehicles. The secondary vehicles can periodically query the mapping service, such as according to a secondary vehicle location or the host vehicle location. In this way, the disclosed systems and methods can improve awareness about obstacles and informing both the host vehicle and secondary vehicles about the usability of individual lanes of the road. Implementations of the present application can be more clearly understood with relation to the figures and the description below.

Referring to FIG. 1, an example of an autonomous device, specifically a vehicle 100, is illustrated. The vehicle 100 can include an obstacle prediction system 160 or components and modules thereof. As used herein, a "vehicle" is any form of motorized transport. In one or more implementations, the vehicle 100 can be an automobile. In some implementations, the vehicle 100 may be any other form of motorized transport that, for example, can operate autonomously, semi-autonomously, or manually by an in-vehicle operator. The vehicle 100 can include the obstacle prediction system 160 or capabilities to support or interact with the obstacle prediction system 160, and thus benefits from the functionality discussed herein. While arrangements will be described herein with respect to automobiles, it will be understood that implementations are not limited to automobiles, but any form of vehicle or device capable of being occupied. Instances of the vehicle, as used throughout, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 2:
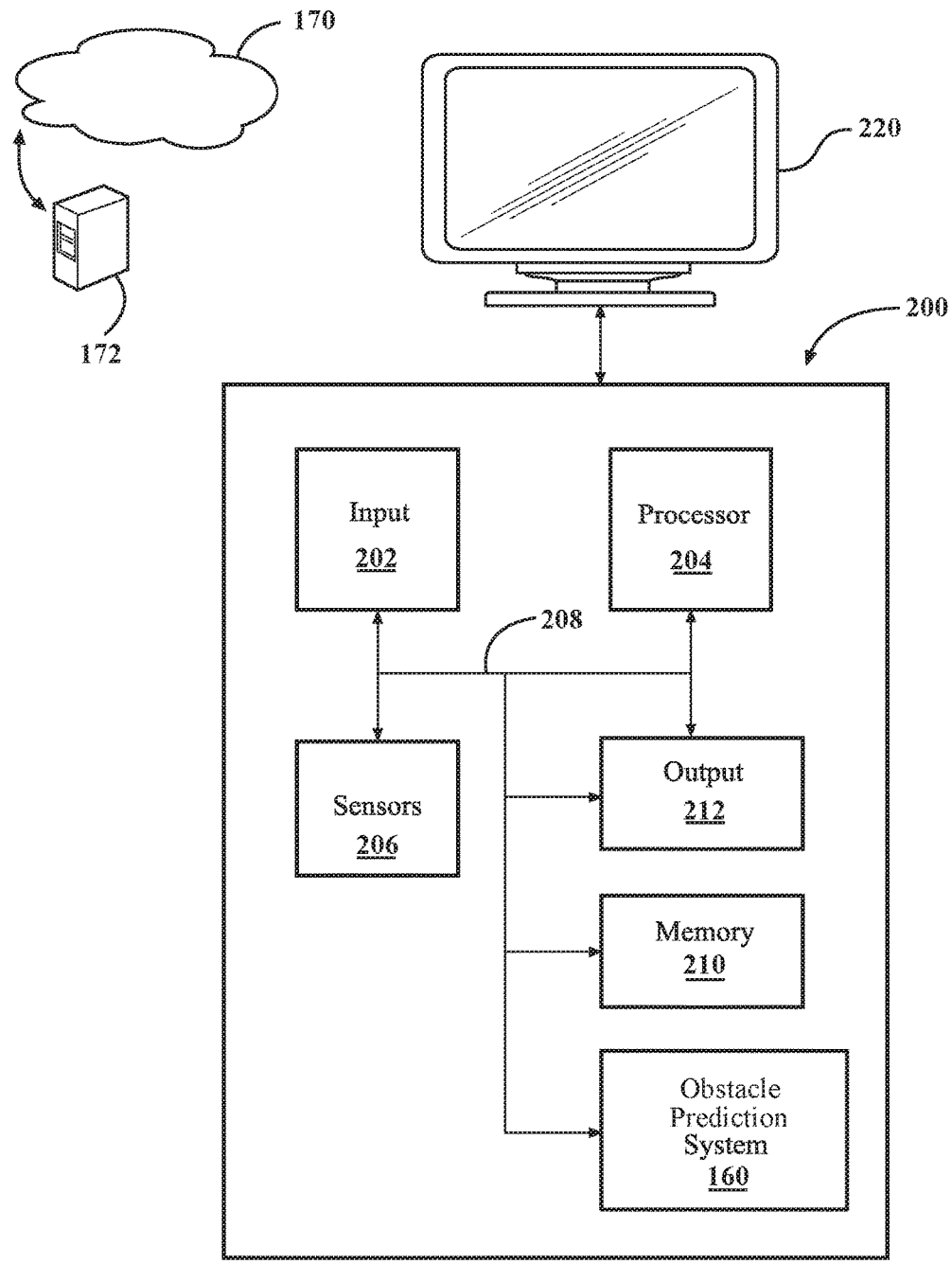
FIG. 2 is a block diagram of a server usable as part of the obstacle prediction system, according to implementations described herein.

FIG. 2 is an example of a computing device 200. The computing device 200 can include any programmable electronic device designed to accept data, perform mathematical or logical operations under the control of software. The computing device 200 can include the obstacle prediction system 160 or capabilities to support or interact with the obstacle prediction system 160, and thus benefits from the functionality discussed herein. In implementations described herein, the vehicle 100 can be in communication with a computing device 200. The vehicle 100 or other device being in communication with the computing device 200 refers to any forms of direct or indirect communication between the computing device 200 and the vehicle 100, including direct wired communication, communication through one or more intermediary computing devices, communication through the cloud, or combinations thereof. The computing device 200 and the vehicle 100 can communicate through the use of a variety of wired or wireless networks. In some implementations, the computing device 200 is a server which is remote from the vehicle 100. In further implementations, the computing device 200 can be integrated into the vehicle 100, such as an embedded system. The computing device 200 can include an obstacle prediction system 160 that is implemented to perform methods and other functions as disclosed herein.

Some of the possible elements of the vehicle 100 and the computing device 200 are shown in FIG. 1 and FIG. 2 respectively. These elements will be described herein, along with subsequent figures. However, a description of many of the elements in FIG. 1 and FIG. 2 will be provided after the discussion of FIGS. 3-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the implementations described herein. Those of skill in the art, however, will understand that the implementations described herein may be practiced using various combinations of these elements.

Figure 3:
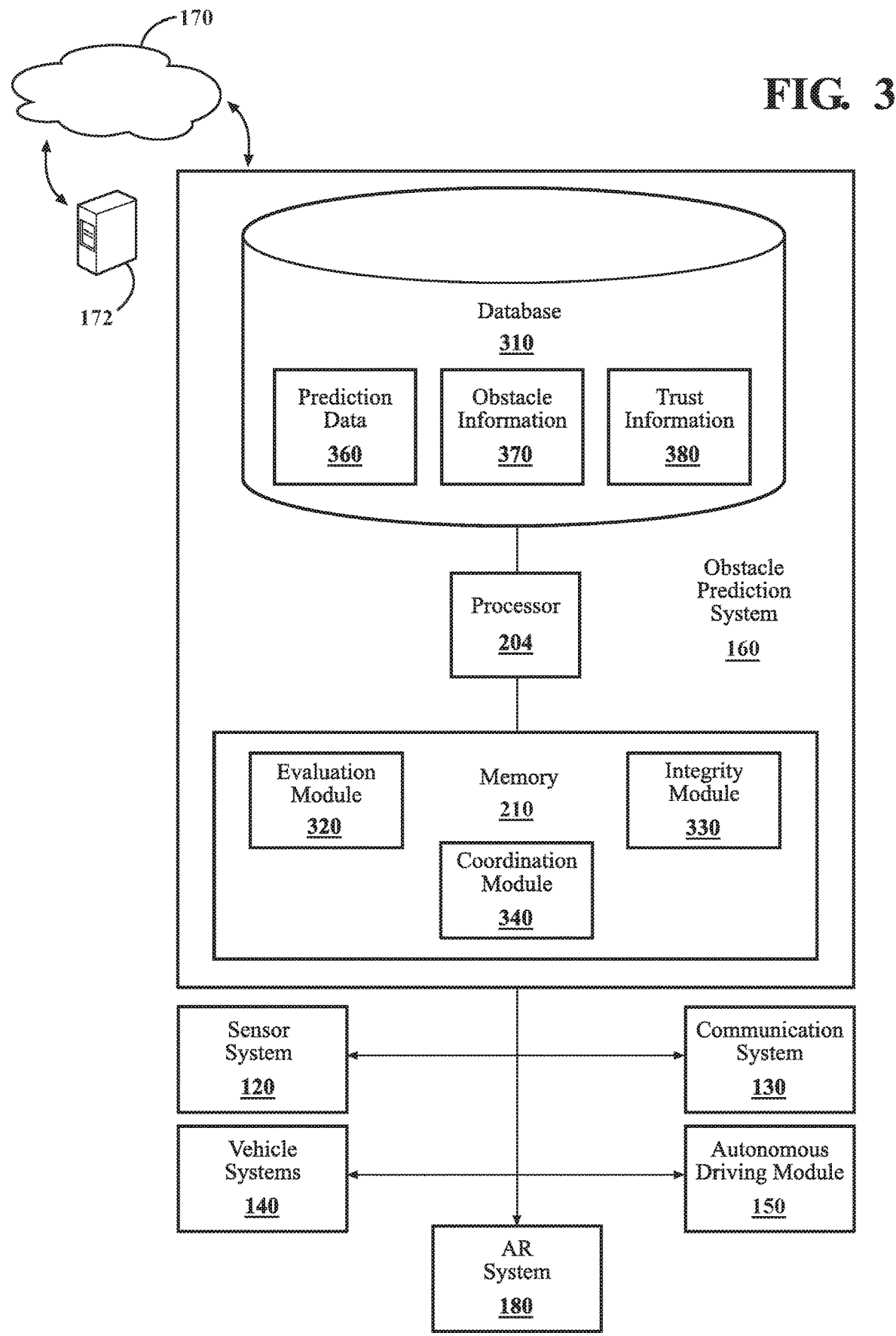
FIG. 3 is an illustration of the obstacle prediction system for the detection of transient obscured obstacles, according to implementations described herein.

The discussion of the obstacle prediction system 160 begins at FIG. 3, with an illustration of the obstacle prediction system 160, according to one implementation. The obstacle prediction system 160 is shown as including the processor 204 from the computing device 200, depicted in FIG. 2. Accordingly, the processor 204 can be a part of the obstacle prediction system 160, the obstacle prediction system 160 can include a separate processor from the processor 204 (e.g., the processor 110 of the vehicle 100), the obstacle prediction system 160 can access the processor 204 through a data bus and/or another communication path, or others. In one implementation, the obstacle prediction system 160 includes the memory 210 that stores an evaluation module 320, an integrity module 330, and a coordination module 340. The memory 210 is a random-access memory (RAM), read-only memory (ROM), a hard disk drive, a flash memory, or other suitable memory for storing the modules 320, 330, and 340. The modules 320, 330, and 340 are, for example, computer-readable instructions that when executed by the processor 204, cause the processor 204 to perform the various functions disclosed herein.

The obstacle prediction system 160 can further include a database 310. The database 310 can be presented in a number of configurations, including as part of the memory 210, as an independent component from the memory 210, as part of a separate memory in the computing device 200 (distinct from memory 210), or others. The database 310 can include prediction data 360, obstacle information 370, and trust information 380. The prediction data 360 can include data and information as detected from the vehicular environment by one or more sources, such as from one or more host vehicle and/or from the host vehicle. The prediction data 360 can include data from multiple vehicles, such as transmitted through a network 170 from the server 172 or the computing device 200, as well as data collected from one or more sensors, such as from a sensor system 120. The obstacle information 370 can include information related to an obscured obstacle or predictions for an obscured obstacle (e.g., the obscured obstacle), including an obstacle type, an obstacle location, an anticipated time frame for the obstacle, and others. The trust information 380 can include information and data indicating the trustworthiness of a vehicle. Trustworthiness can be measured based on any available parameter of reliability, including an overall trust for the vehicle or the operator, trust based on individual parameters, or others. Though the obstacle prediction system 160 is shown as part of the vehicle 100, the obstacle prediction system 160 or portions thereof, can be stored in a separate vehicle, on the computing device 200, the server 172, or others. As such, one or more of the functions of the obstacle prediction system 160, or the modules contained therein, can be performed remotely and transferred to the vehicle 100 as part of the implementations described herein.

The evaluation module 320 can generally include instructions that function to control the processor 204 to receive, in a host vehicle, prediction data about an obscured obstacle from one or more measured vehicles in a vehicular environment. Obscured obstacles includes obstacles which occur in an unplanned or unexpected manner and are not otherwise mapped or directly observable by the host vehicle. Obscured obstacles can include transient obstacles or obstacles which may last for a short time frame. The obscured obstacle can be an obstacle which is obscured from the perspective of the host vehicle. The prediction data can include information about the obscured obstacle received from secondary sources, such as sensor data received at the host vehicle about a measured vehicle, sensor data of an evasive behavior from the one or more measured vehicles, and/or direct reporting of an evasive behavior from the one or more measured vehicles.

The host vehicle is a vehicle that exists within the vehicular environment and may collect or provide data from the environment, including detection and recognition of one or more obscured obstacles and/or one or more evasive behaviors from one or more measured vehicles. The evaluation module 320 can detect and recognize the prediction data using sensor input, such as from the one or more vehicle sensors. The evaluation module 320, acting through or in conjunction with the host vehicle, can predict the obscured obstacles in real-time, such as by using sensor input from the host vehicle. The evaluation module 320 can further use prediction data to refine or modify previous detections of obscured obstacles, such as detections which have been oriented and mapped to the vehicular environment. Further, the evaluation module 320 can receive data from the one or more measured vehicles which can be used to predict obstacles (e.g., raw data).

Further, the evaluation module 320 can include instructions to detect or receive information about evasive behaviors in the vehicular environment. The evasive behaviors can include collections of positions and maneuvers, detected by the host vehicle about the one or more measured vehicles in the environment, indicating road position and changes therein over a period of time. The evasive behaviors can be used to indicate choices made in the vehicular environment due to the one or more obscured obstacles, and, as such, can be included in the prediction data. The evaluation module 320 can apply the evasive behaviors to determine which lane a measured vehicle was in, avoidance maneuvers, type of control of the vehicles (e.g., autonomous or manual), environmental boundaries, time frames for both positions and maneuvers, and others related to the movements of the measured vehicles in the vehicular environment.

The evaluation module 320 can detect the evasive behaviors using available systems of the host vehicle which allow for either detection or inference of evasive behavior in the one or more measured vehicles. In one example, the evaluation module 320 can receive information from the autonomous driving module 150 of the one or more measured vehicles regarding an evasive behavior of the measured vehicles. In some implementations, the evaluation module 320 can receive evasive behaviors based on known vehicle maneuvers (e.g., the measured vehicle self-reporting a turn or other maneuver based on known actuator positions). In another example, the evaluation module 320 can receive indications of movement from the vehicle systems 140 of the measured vehicle (e.g., a measured vehicle sending a signal to the host vehicle that the brakes have been activated). In another example, the evaluation module 320 can infer or determine that movement has occurred through sensor data from the sensor system 120. The sensor system 120 can provide data to the evaluation module 320 automatically, based on specific obstacles, upon request from the evaluation module 320, or upon request from another system or module. One skilled in the art will understand the breadth of detection or inference types described herein, without further recitation of specific examples.

The evaluation module 320 can further include instructions to determine which evasive behaviors relate to an obscured obstacle. In some implementations, the evaluation module 320 can use a temporal connection between the behaviors to determine which evasive behaviors relate to the obscured obstacle. In further implementations, the evaluation module 320 can receive the data transmission or other indication from the measured vehicle which informs the evaluation module 320 that the evasive behavior is related to an obscured obstacle. In yet further implementations, the evaluation module 320 can receive input about an obscured obstacle from the measured vehicle, either as detected from the host vehicle or as determined from the behavior of the measured vehicles around the host vehicle. The information received by the evaluation module 320 from the measured vehicles about the obscured obstacle can include the source of the detection or the determination, as described above. The prediction data, such as detection of the obscured obstacle, evasive behaviors, or related detections can be stored as part of the prediction data 360, such as shown as part of the database 310.

In yet further implementations, the evaluation module 320 can recognize indicators for obscured obstacles from evasive behaviors of the measured vehicles, as detected by the host vehicle. In some implementations, indicators can include the one or more measured vehicles driving off center in the lane, indicating that an obstacle might exist, even absent an evasive behavior. The evaluation module 320 can further predict the obscured obstacles using the reverse integration of object recognition techniques, such as appearance-based methods (e.g., gradient matching or edge matching), feature-based methods (e.g., interpretation trees or pose consistency), and others. In this implementation, the evaluation module 320 can establish a behavior for avoidance of an obstacle based on an object defined using one or more of the object recognition techniques. The evaluation module 320 can then match the behavior to the object that would have resulted in such a maneuver.

The evaluation module 320 can further include instructions to establish a trust level for at least one of the one or more measured vehicles. Trust level, as used herein, refers to one or more data points or indicia which tend to indicate the reliability of information as received from the host vehicle. The evaluation module 320 can establish the trust level including historical or behavioral data related to either the measured vehicle or one or more operators. Trust level, as determined by the evaluation module 320, can further be related to the operating environment. In some implementations, the evaluation module 320 can determine that the measured vehicle or the operator of said vehicle is more or less trustworthy in certain environments, such as highway driving, or city driving. In further implementations, the evaluation module 320 can determine that the measured vehicle or the operator of said vehicle is more or less trustworthy under certain driving conditions, such as night driving or driving in the rain or snow. In some implementations, trust level can include driving skill or driving capability of the operator of the measured vehicle(s). In yet further implementations, trust level can relate on the reliability of the one or more sensors of the measured vehicle(s). In one or more implementations, the evaluation module 320 can determine the trust level as an overall measurement or a measurement of specific elements of driving or handling the road. Examples of trust levels which are an overall measurement can include overall driver quality, overall vehicle quality, general determinations based on a statistically significant category of the operator (e.g., teen drivers versus adult drivers), or others. Examples of trust levels which are measurements of specific elements of driving or handling the road can include specific portions of the vehicle (braking, steering, etc.) or driving capability within specific environments (e.g., driving in inclement weather, night driving, day driving, or others). In further implementations, trust levels can include success data, such as success rates, for one or more previous predictions of obscured obstacles from the detected evasive behavior.

In one or more implementations, the trust level can be subdivided in one or more trust parameters. The trust parameters can be an individual trust level based on elements of the obstacle, elements of the vehicle, elements of the driver, or others which can be used to differentiate levels of trust. Such trust parameters can be used to differentiate areas where a vehicle and/or an operator can be trusted versus those areas where the vehicle and/or operator cannot be trusted. In one example of trust parameters based on elements of the obstacle, trust parameters can include obstacle type, obstacle avoidance, obstacle determination, or others. In one example of trust parameters based on elements of the vehicle, trust parameters can include vehicle handling, obstacle detection, sensor precision, autonomous system quality, and others. In one example of trust parameters based on elements of the driver, trust parameters can include driving skill, aggressiveness, experience, ailments or disabilities which affect driving capability, or others. In some implementations, the evaluation module 320 can apply the trust level for a specific trust parameter to an evasive behavior parameter separate from other evasive behavior parameters and/or trust parameters. In one example, the evaluation module 320 can detect an evasive behavior which involve three evasive behavior parameters: steering, braking and accelerating. The evaluation module can apply the specific trust level for each of the evasive behavior parameters to predict the obscured obstacle.

The trust level can be dependent upon the reliability information available, including both conscious and unconscious reliability information. Conscious reliability information, as used herein, refers to actions or behaviors consciously taken by an operator which affect their overall driving prowess. In some examples, conscious reliability information can include controllable behaviors of the vehicle, such as speeding, hard braking, rapid movement in and out of lanes, aggressive behavior or mannerisms, or others which are controlled by the operator. Unconscious reliability information, as used herein, refers to refers to the innate capability of the vehicle or the operator to perform a desired action in relation to an obscured obstacle. In further examples, unconscious reliability information which can be incorporated into the trust level can include response times, known ailments which may affect driving capability (e.g., eyesight, heart condition, or others), age, driving experience, or others which are innate to the measured vehicle(s) or control of the measured vehicle(s) by the operator.

The integrity module 330 can generally include instructions that function to control the processor 204 to determine an obscured obstacle using the prediction data and the trust level. The prediction data is generally related to information or data received by the host vehicle about an obscured obstacle from the measured vehicles. Thus, the trust level for the measured vehicle or the operator of the measured vehicle can provide information as to the reliability of the prediction data, or components thereof such as the evasive behavior. As such, the obstacle prediction system 160 can use the trust level to determine the obscured obstacle based on that information. In another implementation, the integrity module 330 can apply the trust level to a specific evasive behavior. In yet further implementations, the integrity module 330 can apply the trust level to all prediction data as received from the one or more measured vehicle(s) or a related operator. The trust level can be applied to individual characteristics of the prediction data, or elements thereof, or to all prediction data. Other possible combinations of trust level and components of the prediction data are contemplated without specific further recitation herein.

The integrity module 330 then determines the reliability of the evasive behaviors of the measured vehicle(s), as stored in the prediction data 360. In one or more examples, the trust level can indicate the reliability of the prediction data with reference to a standard or normal. As such, the integrity module 330 can determine that a behavior from one measured vehicle. In further examples, the trust level can indicate the reliability of the prediction data with regards to specific elements such as lane-switching maneuvers or braking. Thus, the integrity module 330 can further include instructions to associate data reliability of the prediction data. The data reliability can be stored as part of the trust information 380, as stored in the database 310. The integrity module 330 can further incorporate successful avoidance data on one or more previous evasive behaviors from the one or more measured vehicles as part of the trust level for the one or more measured vehicles. In some arrangements, success data on one or more previous evasive behaviors from the one or more measured vehicles can be incorporated as part of the trust level for the one or more measured vehicles.

In some implementations, the integrity module 330 can be part of the host vehicle. The host vehicle, or components thereof, can be substantially similar to the vehicle 100, described with reference to FIG. 1. Thus, in one implementation, the integrity module 330 can receive prediction data from one or more measured vehicles, which can then be incorporated into determining the obscured obstacle. In further implementations, the integrity module 330 can receive prediction data as collected by the host vehicle from the one or more measured vehicles. In this implementation, the integrity module 330 can then compare the obscured obstacle, as collected by the host vehicle from the one or more measured vehicles, with the trust level of the measured vehicle and/or the operator of the measured vehicle. Thus, the trust level is used by the integrity module 330 to determine whether the obstacle prediction system 160 will accept and to what level it will accept the measured vehicles actions as predictive of the obscured obstacle.

If the integrity module 330 determines that the trust level for the measured vehicle is not high enough to accept either the obscured obstacle or the prediction data, the integrity module 330 can include one or more follow-up actions with relation to the prediction data or components thereof. The follow-up actions can include rejection of the obscured obstacle and/or the prediction data, request for further information from one or more of the one or more measured vehicles, partial rejection of one or more elements of the prediction data, request for corroboration, or other actions which may lend trust to one or more elements of the information or data. One skilled in the art will understand that there are a variety of permutations of possible actions which can be taken upon rejection of either the obscured obstacle and/or prediction data without further explicit recitation herein.

The obstacle prediction system 160, or modules thereof, can include connecting through a network 170 to an information source, such as another host vehicle or a computing device, such as the server 172. The network 170 can be any form of connection, such as a vehicle to vehicle (V2V) connection, an ad-hoc network, a vehicle to infrastructure (V2I) connection, wireless connection, relay connections, or others. The prediction data is then processed and compared to other prediction data from nearby vehicles based on a temporal connection. The temporal connection, location connection, and action connection indicate an association between two behaviors, either intra- or inter-vehicle, indicating that they are related to the same obstacle. An example of temporal connections can include two vehicles swerving out of a middle lane, one to a left lane and one to a right lane, at the same time, to avoid something (i.e., the time element is what connects the behaviors, without further knowledge). The temporal connection can include a time component between an initial vehicle movement and a second vehicle movement. The time connection can be incorporated with other types of connections, such as a location connection, an action connection, or combinations thereof. An example of location connections can include two or more vehicles avoiding the same location at different times, to avoid something (i.e., the location element acts alongside the time element to connect a behavior, without further knowledge). The relation of time, along with location and/or action, can be used to determine which evasive behaviors relate to an obscured obstacle.

As the prediction data can be derived from a variety of sources (e.g., the host vehicle, one or more measured vehicles, etc.), a variety of processing schemes can be used such that the prediction data is considered in determining the plurality of obstacle behaviors. In some implementations, data as processed from the prediction data by a separate obstacle determination module (e.g., the integrity module 330 on a different vehicle), is transmitted to the vehicle 100 for use in determining the plurality of obstacle behaviors. In further implementations, the prediction data, as stored in the prediction data 360 and the obstacle information 370, from the evaluation module 320 is transmitted to a remote computing device (e.g., the server 172) where the prediction data is used to determine the plurality of obstacle behaviors. The prediction data, including the one or more evasive behaviors, can be subsequently transmitted to the vehicle 100 through the network 170. Further combinations of the obstacle prediction system 160 and modules thereof, being stored in local or remote locations, for the performance of the functions of the system described herein, are envisioned without further explicit recitation of examples herein.

Once the prediction data has been compared to the trust level, the integrity module 330 can then establish obscured obstacles. The determination of obscured obstacles can be based on sensor data (e.g., an obstacle detected in the road), extrapolation from actions (e.g., the vehicles maneuvered as if to dodge a pothole), or others. In some implementations, there may be more than one obscured obstacle (e.g., there may be construction or snow blocking the right-hand lane) or the obscured obstacle may be generic (e.g., an obstacle in the middle lane). In further implementations, the obscured obstacle can be refined over time using new information, such as from publicly available sources, sensor data, or others. The obscured obstacle can be stored as part of the obstacle information 370 in the database 310. Further, this information can be transferred from the host vehicle to a server (e.g., the server 172), or others.

In further implementations, the integrity module 330 can determine a set of environmental boundaries for the obscured obstacles. Environmental boundaries are boundaries of the area in the vehicular environment which are affected by the obscured obstacle. Using a pothole as an example, the pothole cannot be avoided at the edge of the pothole itself. As such, a set area around a pothole is affected by the pothole. This area can have environmental boundaries set by factors related to safely traversing the environment, such as movement speed, roadway conditions, the capability of the vehicle, and others. The integrity module 330 can further include the ability to establish these environmental boundaries in real-time with the prediction of the obscured obstacle as described herein.

The integrity module 330 can further include instructions to map the prediction in the vehicular environment. Here, the integrity module 330 can position the obscured obstacle in an obstacle location. The obstacle location can be a location, general or precise, in the vehicular environment. The obstacle location can include details such as the lane-level location of the obstacle, boundaries affected by the obstacle, parameters which defy lane boundaries, and others. The integrity module 330 can map the obscured obstacle to the obscured obstacle location, based on knowledge level about the obscured obstacle and changes over time, trust level about one or more data points, and others. This association can then be provided to the host vehicle, other autonomous vehicles, other manual vehicles (such as through a communication system 130 or an augmented reality system 180), or other mechanisms. The integrity module 330 can then use the prediction of the obscured obstacle to update a variety of maps, including any known time frames or expected changes. In one example, the obscured obstacle is snow cover making a lane inaccessible. The integrity module 330 can then determine that the temperature is predicted to rise above 50 degrees during the day. As such, the integrity module 330 can determine that the obscured obstacle will not affect the vehicular environment after a certain time in the afternoon and update the map with said information.

Further, obscured obstacles can be correlated through the integrity module 330 to other predicted or known obstacles. The obscured obstacle at an obstacle location may have other associated obstacles which affect the vehicular environment. The integrity module 330 can use parameters such as the type of obstacle, timing, location, and others to determine what obstacles are associated in the vehicular environment. In one example, integrity module 330 determines that the obscured obstacle is a piece of construction equipment is in the center lane. The integrity module 330 can, through a variety of mechanisms (e.g., publicly available information), detect an accident involving a construction vehicle within a specific distance of the obscured obstacle, thus determining that the construction vehicle and the obscured obstacle are related obstacles. Further correlations between the obscured obstacle and the vehicular environment can be formed, using the implementations disclosed herein.

The coordination module 340 can generally include instructions that function to control the processor 204 to create a guidance input for the host vehicle in the vehicular environment using the obscured obstacle and the trust level. The guidance input is one or more steps which the operator or the autonomous vehicle can take to avoid being affected by the obscured obstacle. The guidance input can be related to the type of obstacle, the predicted effects of the obstacle on traffic in the vehicular environment, the likelihood that the obscured obstacle will be cleared, the location of the obstacle, the availability of alternative routes, and others. The guidance input can include a specific route, lanes to avoid or position in, expectations regarding traffic patterns, traffic movements outside of normal lane patterns, or others. Further, the guidance input can include related temporal data collected over time, such as specific obstacles, lane-level obstacles which occur with some known frequency, or others.

As well, the coordination module 340 can create the guidance input by incorporating evasive behaviors and the trust level in the guidance input. It is understood that systems and operators operate with different capabilities and efficiencies. As such, an avoidance technique incorporated into the evasive behavior from one or more operators and/or one or more autonomous vehicles can be incorporated into vehicle choices or lane-level maneuvers. Thus, the evasive behavior, as guided by the trust level, can be provided as part of and/or used to modify the guidance input.

The coordination module 340 can further include instructions to navigate the host vehicle using a guidance input for avoiding the obscured obstacle. The coordination module 340 can navigate the vehicle either directly or indirectly based on operator input, vehicle type (e.g., autonomous or manual), or other control factors. In one implementation, the coordination module 340 can directly take control of the vehicle, such as when the guidance input is presented as instructions to the vehicle systems 140 and controls one or more movements therein. In another implementation, the coordination module 340 can indirectly control the vehicle, such as when the guidance input is presented as instructions to the autonomous driving module 150. In this case, the control is indirect in the sense that the autonomous driving module 150 can alter or deny inputs from the coordination module 340. In another implementation, the guidance input can be presented as an option for the operator or passenger to act on, such as when the guidance input is presented to an operator as instructions/route, or when presented as inputs which can be selected or provided by a passenger.

Figure 4:
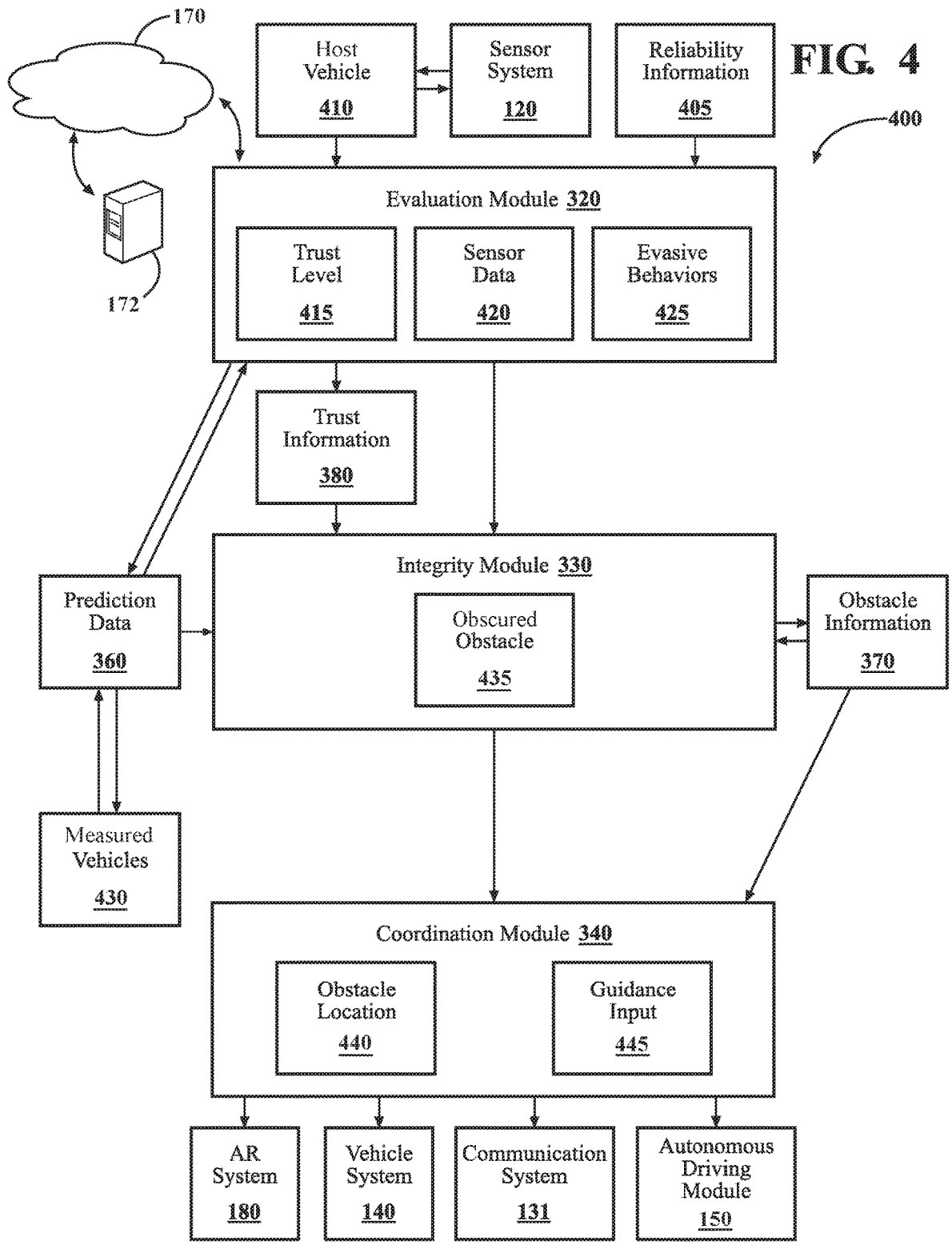
FIG. 4 is a schematic of the obstacle prediction system, according to one or more implementations.

FIG. 4 depicts a schematic 400 of the obstacle prediction system 160, according to one or more implementations. The obstacle prediction system 160, using the evaluation module 320, collects prediction data through the host vehicle regarding the one or more measured vehicles in the vehicular environment. The evaluation module 320 further collects reliability information 405 to establish trust levels for the one or more measured vehicles. The evaluation module 320 can the compare the prediction data, in light of the trust level, to determine if one or more evasive behaviors and/or other information relate to an obscured obstacle. The integrity module 330 can apply the trust level to the detected evasive behaviors from one or more measured vehicles to predict the obscured obstacle. Using the previously established prediction, the coordination module 340 can determine the location range of the obscured obstacle (i.e., the obstacle location) in the vehicular environment. As well, the coordination module 340 can generate guidance input for the avoidance of the obstacle by the host vehicle, as appropriate. Thus, through the use of the obstacle prediction system 160, the host vehicle can use detected evasive behaviors from one or more measured vehicles in light of the reliability of the measured vehicle, to predict obscured obstacles in the vehicular environment.

As shown here, the schematic 400 begins with the evaluation module 320 collecting data and information from a variety of sources, including reliability information 405 and sensor data 420 (e.g., such as through a host vehicle 410 and a sensor system 120). The prediction data can include sensor data 420. The sensor data 420 can include one or more evasive behaviors 425 as detected from the one or more measured vehicles 430. The sensor data 420 can be collected by host vehicle 410 from the one or more measured vehicle 430, such as from the sensor system 120. The reliability information 405 can be derived from a variety of sources, including historic interactions between the measured vehicles 430 and the obstacle prediction system 160. The evaluation module 320 can apply the reliability information 405 to determine a trust level 415 for the evasive behavior 425.

The prediction data 360, which can include sensor data 420 and other information regarding the evasive behavior 425, can then be collected by the host vehicle 410. In one or more implementations, the host vehicle 410 can include the evaluation module 320 which also collects sensor data 420 using one or more sensors of a sensor system, such as the sensor system 120. The host vehicle 410 can be substantially similar to the vehicle 100 described with reference to FIG. 1. The prediction data 360 can be stored in a database, such as the database 310, described with reference to FIG. 3. The evasive behavior 425 can include movements, as transmitted and/or detected, from and/or about, the one or more measured vehicles 430. The sensor data 420 and/or the evasive behavior 425 can be stored as part of the prediction data 360.

The prediction data 360 can further be stored or copied for storage at a remote site, such as the server 172 through the network 170. The reliability information 405 can be applied to create a trust level 415 for one or more of the one or more measured vehicles 430. The trust level 415 can be a measure of the reliability of data or information as received from one or more measured vehicles 430. The trust level 415 can then be incorporated in the trust information 380. The prediction data 360 and trust information 380 can further be forwarded by the evaluation module 320 to the integrity module 330. The integrity module 330 can access or receive the prediction data 360, and the trust information 380 to determine one or more obscured obstacles. The prediction data 360 can indicate an obscured obstacle in the vehicular environment, such as an unpassable stretch or lane of the road, obstacles which affect vehicle travel or other obstacles which change the behavior of the measured vehicles 430 in the vehicular environment. The trust information 380 can then be weighed against the prediction data 360 by the integrity module 330 to predict an obscured obstacle 435, as described above with reference to FIG. 3. Thus, the trust information 380 can be applied to determine which prediction data 360 should be relied upon and to what extent in predicting the obscured obstacle 435. The prediction of the obscured obstacle 435 can then be stored as part of the obstacle information 370 and/or forwarded to the coordination module 340.

The coordination module 340 can then map the obscured obstacle 435 to an obstacle location 440, using the trust level 415 and the prediction of the obscured obstacle 435. In one or more implementations, the coordination module 34 can apply the trust level 415 and the prediction data 360, to set one or more boundaries for the obstacle location 440 of the obscured obstacle 435. The prediction of the obscured obstacle 435 can provide an estimate of the size necessary for the obstacle to exist or the likely size of the obstacle, such as a car accident or a ladder lost from a truck in the road. The evasive behavior 425, in light of the trust level 415, can provide information on possible guidance behaviors from the host vehicle 410 as well as the precision of information about the obscured obstacle. Using this information, the coordination module 340 can create an estimate of the obstacle location 440 for the obscured obstacle 435.

With the obstacle location 440 defined, the coordination module 340 can formulate guidance input 445 for the vehicle 100. As described above, the guidance input 445 can be modified based on the evasive behavior 425 and the trust level 415. The guidance input 445, as described above, can be a specific route for the host vehicle to follow which is expected to avoid or safely traverse the obscured obstacle 435, possible maneuvers for the host vehicle, the general avoidability (e.g., obstacle avoidability) of the obscured obstacle 435, and others. In one or more implementations, an obscured obstacle can be determined to be unavoidable, such as if the course is maintained or lane position is maintained. When an obscured obstacle the is determined to be unavoidable, the guidance input 445 can include rerouting the host vehicle or bringing the host vehicle to a complete stop to prevent damage or injury. The guidance input 445 can then be provided to the host vehicle or the operator, such as through the augmented reality (AR) system 180 or the communication system 130 when presenting the guidance input 445 for a manually driven vehicle. In another implementation, the guidance input 445 can be provided as instructions to the vehicle system 140 and/or the autonomous driving module 150, when presenting guidance input 445 to an autonomous vehicle.

The obstacle prediction system 160 described herein can provide numerous benefits for both autonomous and non-autonomous vehicles. The obstacle prediction system 160 includes the detection of evasive behaviors with relation to one or more measured vehicles, a weighing of the detected evasive behaviors against a trust level, and prediction of an obscured obstacle based on the evasive behaviors and trust level in a vehicular environment. The obstacle prediction system 160 does not rely on visualizing or sensing the obstacle itself. Thus, the obstacle prediction system 160 does not suffer the same limitations regarding proximity, detection efficiency, or others. Further, the obstacle prediction system 160 can detect lane-level obstacles based on the detection of measured vehicle actions, allowing for the determination of changes in the vehicular environment more quickly.

Figure 5:
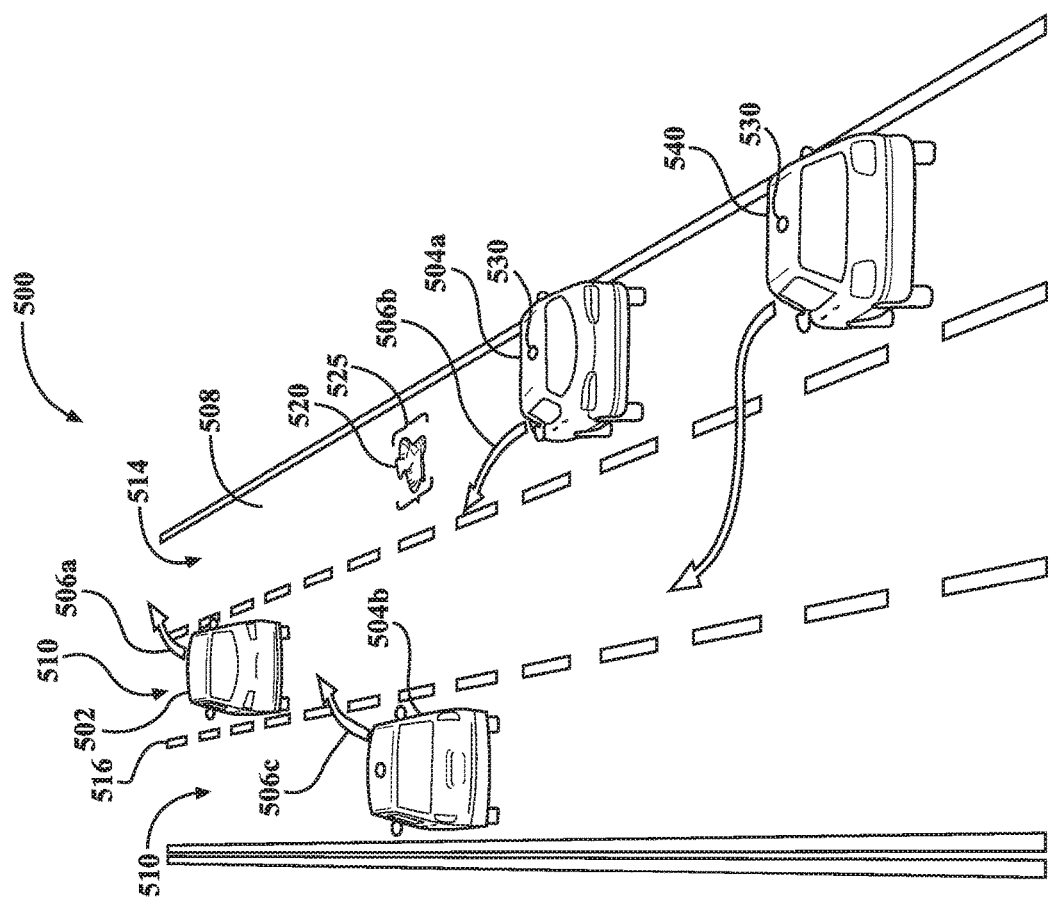
FIG. 5 depicts an operator in a vehicle incorporating the obstacle prediction system, according to implementations described herein.
Figure 5:
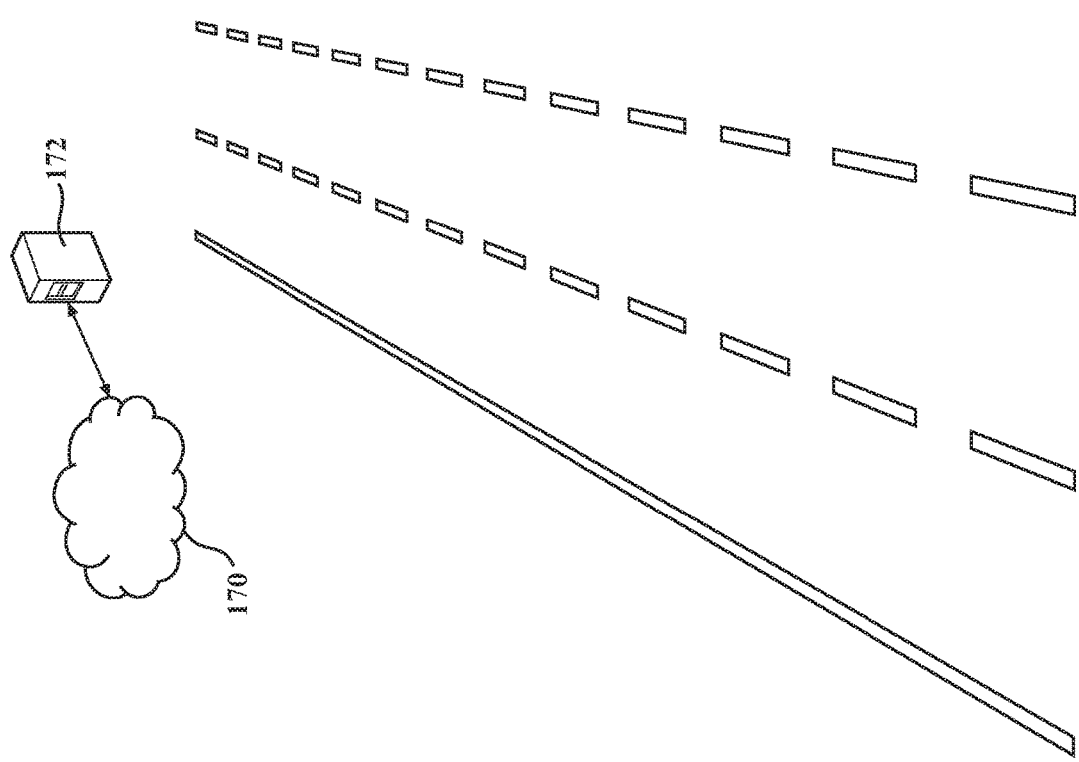

FIG. 5 depicts a host vehicle 540 in a vehicular environment 500 employing the obstacle prediction system 160, according to one or more implementations. The obstacle prediction system 160 applies a trust level for the one or more measured vehicles to the prediction data, such as sensor data and evasive behaviors, to determine the existence of one or more obscured obstacles, including location and possible responses to said obstacles. As shown here, the vehicular environment 500 includes a road 508 having a first lane 510, a second lane 512 and a third lane 514. The first lane 510, the second lane 512 and the third lane 514, as delineated by one or more road markings 516 are part of traffic patterns to control vehicle position and separation on the road 508.

The vehicular environment 500 can further include a variety of measured vehicles, such as one or more novel measured vehicles 502, and one or more known measured vehicles 504a and 504b. The novel measured vehicles 502 are vehicles which incidentally occur within the vehicular environment 500 and perform one or more evasive behaviors, shown here as evasive behaviors 506a, 506b, and 506c. The novel measured vehicles 502 have no known trust information. Though the obstacle prediction system 160 is shown using the novel measured vehicles 502 and the one or more known measured vehicles 504a and 504b, the number of novel measured vehicles and known measured vehicles detected and measured by the obstacle prediction system 160 can be any amount of vehicles. Further, the vehicular environment 500 can include one or more traffic obstacles, described here with relation to the obscured obstacle 520, and depicted as a pothole in the third lane 514 of the road 508. As stated previously, the obstacle prediction system 160 and/or components thereof, can be stored in the host vehicle 540, the server 172, the computing device 200, or combinations thereof.

The obstacle prediction system 160 can begin with the evasive behaviors 506a, 506b, and 506c. The evaluation module 320 of the obstacle prediction system 160 collects information on the vehicular environment 500 including detecting the evasive behaviors 506a, 506b, and 506c. The evasive behaviors 506a, 506b, and 506c, can be detected using a sensor system, such as the sensor system 530 of the host vehicle 540. The sensor system 530 can be substantially similar to the sensor system 120, described with reference to the vehicle 100 in FIG. 1. The sensor systems 530, as used between each of the vehicles in the vehicular environment, can include one or more elements of the sensor system 120. The sensor systems 530 need not have the same elements or any elements consistent between them. Evasive behaviors 506a, 506b, and 506c, can further be detected, such as by using the sensor system 530 of the host vehicle 540, or reported using one or more internal systems, such as the measured vehicle 504a self-reporting information about the evasive behaviors 506b of the measured vehicle 504a.

As shown here, prediction data on the evasive behaviors 506a, 506b, and 506c can be collected from one or more measured vehicles 504a and 504b using the sensor system 530 of the host vehicle 540. In this example, the evaluation module 320 in the host vehicle 540 detects that the evasive behavior 506a includes the novel measured vehicle 502 continuing in the second lane 512. The evaluation module 320 further detects that the evasive behavior 506b includes the known measured vehicle 504a switching from the second lane 512 to the third lane 514, with a transition point 525a between the third lane 514 and the second lane 512. The evaluation module 320 further detects that the evasive behavior 506c includes the known measured vehicle 504b transitioning from the first lane 510 to the second lane 512. The detections of the evasive behaviors 506a, 506b, and 506c can then be stored in a database, such as the database 310, or otherwise made available to the integrity module 330.

The integrity module 330 can then determine if one or more of the evasive behaviors relate to a specific obstacle. The evasive behaviors 506a, 506b, and 506c, as described above, are actions or maneuvers performed by the measured vehicles in the environment. The evasive behaviors which can be responsive to an obstacle. As such, one or more of the evasive behaviors 506a, 506b, and 506c can be applied to prediction of the obstructed obstacle. As shown here, the known measured vehicle 504a appears to be responding to an obstacle in the third lane 514. The integrity module 330 can determine, based on the abruptness of the movement from the known measured vehicle 504b, self-reporting from the autonomous driving module 150 of the known measured vehicle 504a, and a detection of an evasive movement by the host vehicle 540, that the evasive behavior 506b is related to the obscured obstacle 520. In this implementation, the known measured vehicle 504a can move in a way that indicates evasion of the obscured obstacle 520 in the third lane 514. The determination can further be made based on the temporal connection and the location connection of the evasive behaviors 506b, 506c, and 506d.

The obstacle prediction system 160 can further associate evasive behaviors based on the trust level. In one or more implementations, the trust level can be differentiated between the vehicle and the operator. In this example, the known measured vehicle 504a can be considered to have a high trust level based on reliable sensor data and vehicle operation. Further, the known measured vehicle 504a can be determined to have an operator having a low trust level, based on aggressive driving in otherwise poor driving skill. The novel measured vehicle 502 can either be ignored, weighted based solely on movement observed in the vehicular environment, or treated neutrally (neither trusted nor distrusted). As such, the obstacle prediction system 160 can largely ignore or put minimal weight on the apparent evasive behavior 506a and 506c, while giving high weight to the data provided by evasive behavior 506b from the known measured vehicle 504a. As such, the obstacle prediction system 160 can determine that the obscured obstacle 520 exists in the third lane 514 while ignoring a possible obscured obstacle in the first lane 510 and the second lane 512.

The movements of the known measured vehicle 504a, as included in the evasive behavior 506b, and the sensor information received from host vehicle 540, can be used to determine the existence of and prediction of an obscured obstacle. Based on the movement of the known measured vehicle 504a and the data from the host vehicle 540, the obstacle prediction system 160 can determine that an obscured obstacle exists, such as an obstacle 520 in the third lane 514 of the road 508. As shown, the known measured vehicle 504a and the novel measured vehicle 502 are forming a space in the third lane 514, as shown by the avoidance of the region in the evasive behaviors 506b, 506c, and 506d. The integrity module 330 can determine that an obstacle exists, even without viewing the region, such as with the evasive behavior 506b being received by the integrity module 330 as described herein. The obscured obstacle 520 at the obstacle location 525 can be related to the type of evasive behavior, such as avoidance of a region indicates that the area of the road cannot be safely driven on and may include a road hazard. The obscured obstacle 520 can be refined based on further information received, such as emergency scanners receiving information that an object has been dropped in the vicinity. This information can be correlated to the obscured obstacle 520 to refine the type of obstacle predicted, however, the obscured obstacle need not precisely describe the obscured obstacle 520.

The integrity module 330 can then provide instructions to map the obscured obstacle in the vehicular environment. The obstacle location 525 includes a vehicle-level location of the obscured obstacle 520. The evasive behaviors 506b and the sensor data from host vehicle 540 indicate a general position of the obstacle location 525. In some implementations, the integrity module 330 can determine a lane-level position for the obstacle location 525 of the obscured obstacle 520, such as a position with respect to the known measured vehicles 504a and 504b. With consideration of nature of obstacles, the obstacle location 525 of the obscured obstacle 520 may not follow or be restricted by the road markings 516. Thus, the exact timing and positioning of the evasive behavior 506b of the known measured vehicle 504a can offer an indication of the obstacle location 525.

The coordination module 340 can then formulate a guidance input for the host vehicle 540. The host vehicle 540 is the vehicle which receives the information from the obstacle prediction system 160. The coordination module 340 of the obstacle prediction system 160 can then apply the obscured obstacle, the obstacle location, and trust level for the known measured vehicle 504a and 504b, to determine the guidance input. The guidance input tells the host vehicle 540 how the vehicle or operator should respond to avoid or safely traverse the obstacle. In this example, the known measured vehicle 504a has already been determined to have an operator with a low trust level. The known measured vehicle 504b can include an operator with a high trust level, based on high skill and experience. Further, the operator of the known measured vehicle 504b can be known to have issues with braking, thus creating a low trust level parameter on braking time. In light of this, the coordination module 340 can produce a guidance input which includes one or more elements of the vehicle maneuver from the known measured vehicle 504b with modifications for delay time based on operator trust level for deceleration.

The coordination module 340 can then provide the guidance input to the host vehicle 540. As shown here, the host vehicle 540 receives a guidance input from the coordination module 340. The coordination module 340 can provide the guidance input directly, such as through the autonomous driving module 150, or indirectly, such as by providing instructions to the operator of the host vehicle 540. In one implementation, the guidance input is information delivered to the operator through the communication system 130 indicating that the host vehicle 540 should move from the third lane 514 to the second lane 512. In another implementation, the guidance input is instructions to the autonomous driving module 150 for controlling the host vehicle 540 and moving from the third lane 514 to the second lane 512. The guidance input can include indications where the obstacle is expected to begin and end and/or where the operator should begin maneuvers, allowing the operator or the autonomous driving module 150 to change course appropriately.

The obstacle prediction system 160 can thus provide numerous benefits for the vehicles in the vehicular environment. The obstacle prediction system 160 does not require specific detection of the obstacle to provide information for avoidance or safe traversal of said obstacle. Thus, by using the obstacle prediction system 160, non-descript obstacles can be detected and avoided by the host vehicle 540.

Figure 6:
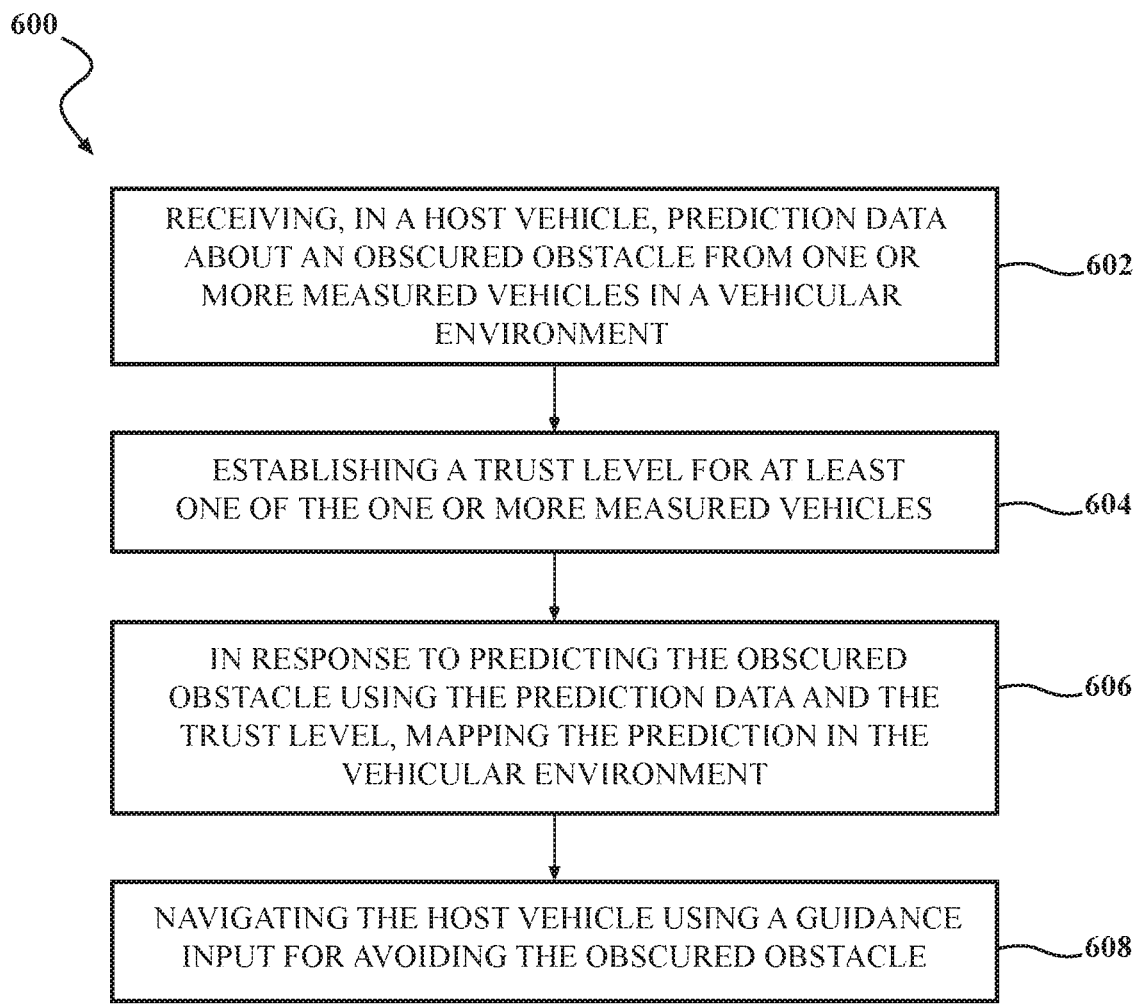
FIG. 6 is a block diagram of a method for detection of transient obscured obstacles, according to one or more implementations.

FIG. 6 is a block diagram of a method 600 for detection of obscured obstacles in an environment, according to one or more implementations herein. The method 600 can be implemented by systems or devices described herein, such as the obstacle prediction system 160 in the vehicle 100. The method 600 can include a collection of prediction data from indirect sources, such as sensor data from the host vehicle about evasive behavior from measured vehicles. Prediction data can be considered based on the trust level of the measured vehicle, followed by determining the obstacle type and location and forming a guidance input for the host vehicle. Thus, the method 600 can respond to obscured obstacles and safely navigate the host vehicle. As described herein, the method 600 includes receiving, in a host vehicle, prediction data about an obscured obstacle from one or more measured vehicles in a vehicular environment, at 602. Then, a trust level can be established for at least one of the one or more measured vehicles, at 604. In response to predicting the obscured obstacle using the prediction data and the trust level, the prediction can then be mapped in the vehicular environment, at 606. Then, the host vehicle can be navigated using a guidance input for avoiding the obscured obstacle, at 608.

The method 600 can begin by receiving, in a host vehicle, prediction data about an obscured obstacle from one or more measured vehicles in a vehicular environment, at 602. The obscured obstacle can be obscured from the perspective of the host vehicle. Prediction data can include information about an obscured obstacle, such as sensor data received from a host vehicle, sensor data of an evasive behavior from a measured vehicle, and/or direct reporting of an evasive behavior from a measured vehicle. The detection and recognition can be performed using sensor input, such as from the one or more vehicle sensors. Obscured obstacles can be recognized from the behavior of the measured vehicles by the host vehicle in real-time, such as by using sensor input from the host vehicle. In yet further implementations, indicators for obscured obstacles can be recognized from behaviors of the measured vehicles. Further, the method 600 can receive data from the one or more measured vehicles which can be used to detect or recognize obstacles (e.g., raw data).

Further, the method 600 can include detecting or receiving information about evasive behaviors in the vehicular environment. The evasive behaviors can be used to indicate choices made in the vehicular environment due to one or more obscured obstacles. The method 600 can include applying the evasive behaviors to indicate which lane a vehicle was in, avoidance maneuvers, type of control of the vehicles (e.g., autonomous or manual), time frames for both positions and maneuvers, and related sensor data. The method 600 can include collecting evasive behaviors using available systems which allow for either detection or inference of evasive behavior. In some implementations, the evasive behaviors can be sent based on known vehicle maneuvers (e.g., the measured vehicle self-reporting a turn or other maneuver based on known actuator positions) or vehicle observations through sensors.

The method 600 can then include determining which evasive behaviors relate to an obscured obstacle. In some implementations, the method 600 can use a temporal connection between the behaviors to determine which evasive behaviors relate to the obscured obstacle. In further implementations, the method 600 can include receiving a data transmission or other indication from the measured vehicle. The information received from the measured vehicle about the obscured obstacle can include the source of the detection or the determination, as described above.

The collection of prediction data can be performed as part of a system, such as the obstacle prediction system 160, described with reference to FIG. 3. The obstacle prediction system 160 can include the evaluation module 320. The evaluation module 320 can generally include instructions that function to control the processor 204 to collect prediction data from the vehicular environment and the one or more measured vehicles, such as one or more evasive behaviors. The evasive behaviors can be substantially similar to the evasive behaviors, described with reference to FIGS. 3 and 4. The evasive behaviors can be stored as part of the prediction data 260. The prediction data 360 can be stored in a database, such as the database 310, described with reference to FIG. 3.

A trust level can be established for at least one of the one or more measured vehicles, at 604. Trust level can include historical or behavioral data related to either the measured vehicle or one or more operators. Trust level can further be related to the operating environment, such as the vehicular environment in which the measured vehicle is being operated. In one implementation, trust level can include driving skill or driving capability of the operator of the measured vehicle. In some implementations, the trust level can relate to the reliability of the one or more sensors of the measured vehicle. In one or more implementations, the trust level can be an overall measurement or a measurement of specific elements of driving or handling the road. The application of the trust level can be dependent upon the reliability information available, including both conscious and unconscious reliability information. In some examples, conscious reliability information can include controllable behaviors of the vehicle, such as speeding, hard braking, rapid movement in and out of lanes, aggressive behavior or mannerisms, or others which are controlled by the operator. In further examples, unconscious reliability information which can be incorporated into the trust level can include response times, known ailments which may affect driving capability (e.g., eyesight, heart condition, or others), age, driving experience, or others which are innate to the measured vehicle or control of the measured vehicle by the operator.

The determination of trust level can be performed as part of a system, such as the obstacle prediction system 160, described with reference to FIG. 3. The obstacle prediction system 160 can include the evaluation module 320. The evaluation module 320 can generally include instructions to establish a trust level for at least one of the one or more measured vehicles. The trust levels can be substantially similar to the trust levels, described with reference to FIGS. 3 and 4. The trust levels can be stored as part of the trust information 380. The trust information 380 can be stored in a database, such as the database 310, described with reference to FIG. 3.

The method 600 can further include predicting the obscured obstacle using the prediction data and/or the trust level, at 606. The prediction of the obscured obstacle can be based on information from one or more indirect sources. The prediction of the obscured obstacle, in one or more implementations, includes related information or data received about an obscured obstacle from a host vehicle, based on detected evasive behaviors of one or more measured vehicles. Thus, the trust level for the measured vehicle or the operator of the measured vehicle can provide information as to the reliability of the prediction data, such that the trust level can be used to predict the obscured obstacle based on that information. In some implementations, the trust level can be applied to the prediction data or components thereof such as the evasive behaviors or sensor data as received from a host vehicle or a related operator. The method 600 further includes making a determination about the reliability of the prediction data. In one or more examples, the trust level can indicate the reliability of the prediction data with reference to a standard or normal. In further examples, the trust level can indicate the reliability of the prediction data with regards to specific elements such as lane maneuvers or braking.

If the method 600 determines that the trust level for the measured vehicle is not high enough to accept either the prediction of an obscured obstacle or the prediction data generally, the method 600 can include performing one or more follow-up actions with relation to the obscured obstacle and/or the prediction data. The follow-up actions can include rejection of the prediction data or components thereof, request for further information from one or more of the one or more measured vehicles, partial rejection of one or more elements of the prediction data, request for corroboration, or other actions which may lend trust to one or more elements of the prediction data. Once the prediction data has been compared to the trust level, the method 600 can then apply the weighted prediction data in predicting the obscured obstacles. The prediction of the obscured obstacles can be based on sensor data (e.g., an obstacle detected in the road), extrapolation from actions (e.g., the vehicles maneuvered as if to dodge a pothole), or others. In some implementations, there may be more than one obscured obstacle (e.g., there may be construction or snow blocking the right-hand lane) or the obscured obstacle may be generic (e.g., an obstacle in the middle lane). In further implementations, the obscured obstacle can be refined over time, using new information, such as from publicly available sources, sensor data, or others.

The prediction of the obscured obstacle can be performed as part of a system, such as the obstacle prediction system 160, described with reference to FIG. 3. The obstacle prediction system 160 can include the integrity module 330. The integrity module 330 can generally include instructions that function to control the processor 204 to predict an obscured obstacle using the prediction data and/or the trust level. The obscured obstacle can be substantially similar to the obscured obstacle, described with reference to FIGS. 3 and 4. The prediction data can inform the obstacle prediction system 160 regarding one or more types of obstacle which correspond to the prediction data. The obscured obstacle can be stored as part of the obstacle information 370. The obstacle information 370 can be stored in a database, such as the database 310, described with reference to FIG. 3.

In response to predicting the obscured obstacle using the prediction data and the trust level, the prediction can then be mapped in the vehicular environment, at 606. Here, the method 600 can include positioning the obscured obstacle in an obstacle location. The obstacle location can be a location, general or precise, in the vehicular environment. The obstacle location can include details such as lane-level location of the obstacle, boundaries affected by the obstacle, parameters which defy lane boundaries, and others. The obscured obstacle can then be positioned in the obstacle location, based on knowledge level about the obstacle and changes over time, trust level about one or more data points as related from the measured vehicles, and others. This association can then be applied by the host vehicle and provided to other vehicles. The prediction of the obscured obstacle can then be used to update a map, including any known time frames.

Further, the prediction of the obscured obstacle can be correlated to other predicted or known obstacles. The obscured obstacle at an obstacle location may have other associated obstacles which affect the vehicular environment. The method 600 can include using parameters such as the type of obstacle, timing, location, and others to determine what obstacles are associated in the vehicular environment.

The mapping of the obscured obstacle can be performed as part of a system, such as the obstacle prediction system 160, described with reference to FIG. 3. The obstacle prediction system 160 can include the integrity module 330. The integrity module 330 can generally include instructions that function to control the processor 204 to map the obscured obstacle in the vehicular environment. The obscured obstacle can be substantially similar to the obscured obstacle, described with reference to FIGS. 3 and 4. The obscured obstacle and the obstacle location can be stored as part of the obstacle information 370. The obstacle information 370 can be stored in a database, such as the database 310, described with reference to FIG. 3.

Then, the host vehicle can be navigated using a guidance input for avoiding the obscured obstacle. The guidance input is one or more steps which the operator or the autonomous vehicle can take to avoid being affected by the obscured obstacle. The guidance input can be related to the type of obstacle, the predicted effects of the obstacle on traffic in the vehicular environment, the likelihood that the obscured obstacle will be cleared, the location of the obstacle, the availability of alternative routes, and others. The guidance input can include a specific route, lanes to avoid or position in, expectations regarding traffic patterns, traffic movements outside of normal lane patterns, or others. Further, the guidance input can include related temporal data collected over time, such as specific obstacles, lane-level obstacles which occur with some known frequency, or others.

The method 600 can include creating the guidance input by incorporating evasive behaviors and the trust level in the guidance input. It is understood that systems and operators operate with different capabilities and efficiencies. As such, an avoidance technique incorporated into the evasive behavior from one or more operators and/or one or more autonomous vehicles can be incorporated into vehicle choices or lane-level maneuvers. Thus, an evasive behavior, as guided by the trust level, can be provided as part of and/or used to modify the guidance input.

The formulation of guidance input can be performed as part of a system, such as the obstacle prediction system 160, described with reference to FIG. 3. The obstacle prediction system 160 can include the coordination module 340. The coordination module 340 can generally include instructions that function to control the processor 204 to create a guidance input for a host vehicle in the vehicular environment using the obscured obstacle and the trust level. The guidance input can be substantially similar to the guidance input, described with reference to FIGS. 3 and 4. The guidance input can be transmitted to a vehicle or an operator, as described in FIG. 3.

Then, the method 600 can further include navigating the host vehicle using the guidance input. The method 600 can include navigating the host vehicle either directly or indirectly based on operator input, vehicle type (e.g., autonomous or manual) or other control factors. In one implementation, the method 600 can include directly taking control of the vehicle, such as when the guidance input is presented as instructions to the vehicle systems and controls one or more movements therein. In another implementation, the method 600 can include indirectly controlling the host vehicle, such as when the guidance input is presented as instructions to an autonomous driving system. The control can be indirect in the sense that the autonomous driving module can alter or deny inputs from the method 600. In another implementation, the guidance input can be presented as an option for the operator or passenger of the host vehicle to act on, such as when the guidance input is presented to an operator as instructions/route, or when presented as inputs which can be selected or provided by a passenger.

The navigation using the guidance input can be performed as part of a system, such as the obstacle prediction system 160, described with reference to FIG. 3. The obstacle prediction system 160 can include the coordination module 340. The coordination module 340 can further include instructions to navigate the host vehicle using the guidance input. The coordination module 340 can navigate the vehicle either directly or indirectly based on operator input, vehicle type or other control factors. The guidance input can be substantially similar to the guidance input, described with reference to FIGS. 3 and 4. The guidance input can be transmitted to a vehicle or an operator, as described in FIG. 3.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy. For example, the vehicle 100 can operate according to the Society of Automotive Engineers (SAE) automated vehicle classifications 0-5.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM, flash memory, ROM, EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as a display device 133, and one or more audio devices 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The processor(s) 110, and/or the autonomous driving module(s) 150 can be operably connected to communicate with the various vehicle systems 140 and/or individual components thereof. For example, returning to FIG. 1, the processor(s) 110 and/or the autonomous driving module(s) 150 can be in communication to send and/or receive information from the various vehicle systems 140 to control the movement, speed, maneuvering, heading, direction, etc. of the vehicle 100. The processor(s) 110, the obstacle prediction system 270, and/or the autonomous driving module(s) 150 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 150. The autonomous driving module(s) 150 can be configured to receive data from the sensor system 120 and/or any other type of system capable of capturing information relating to the vehicle 100 and/or the external environment of the vehicle 100. In one or more arrangements, the autonomous driving module(s) 150 can use such data to generate one or more driving scene models. The autonomous driving module(s) 150 can determine the position and velocity of the vehicle 100. The autonomous driving module(s) 150 can determine the location of obstacles, or other environmental features including traffic signs, trees, shrubs, neighboring vehicles, pedestrians, etc.

The vehicle 100 can further include an AR system 180. It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real world, modifications of objects in the real world, and/or a combination of the two. In one implementation, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the obstacle prediction system 160. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience.

Referring to FIG. 2, an example of a computing device 200 having the obstacle prediction system 160 is illustrated. The computing device 200 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). Shown here, the computing device 200 is a server connected with a display device 220. While arrangements will be described herein with respect to servers, it will be understood that implementations are not limited to servers. In some implementations, the computing device 200 can be any other form of computing device that, for example, can receive data transmissions from one or more vehicles, send data transmissions to one or more vehicles, and can benefit from the functionality of the obstacle prediction system discussed herein.

The computing device 200 can have an input 202. The input 202 can be configured to send or receive information, such as in an electronic format. In one or more examples, the input 202 can be configured to obtain environmental information, obtain vehicular information, and/or for communication with other computing devices. The input 202 can include one or more connections, either wired or wireless, for use as an input device to the computing device 200. An input device can include any device capable of providing input to a computer in any fashion, including through the use of an intermediate device. The input 202 can be any suitable communication interface, which can be dependent on device type. Examples of interfaces for the input 202 can include, but are not limited to, USB (universal serial bus), Lightning, frame grabber, Ethernet, or Firewire.

The computing device 200 can further include one or more processor(s) 204, such as a general purpose processor, for use in the data processing and analysis described herein. The processor 204, which can also be referred to as a central processing unit (CPU), can be a device which is capable of receiving and executing one or more instructions to perform a task as part of a computing device. In one implementation, the processor(s) 204 can include a microprocessor such as an application-specific instruction set processor (ASIP), a graphics processing unit (GPU), a physics processing unit (PPU), a DSP, an image processor, a co-processor, or others. Though referenced as the processor 204 at one or more points throughout the specification, it is understood that one or more processor(s) 204 can be used in one or more implementations described herein, including combinations of processors 204. In some implementations, the input 202 can be connected with sensors 206 (e.g., the sensor system 120 of the vehicle 100, sensors available via infrastructure, etc.), microphones, or other active or passive input devices or systems. In further implementations, the computing device 200 can include a connection 208. The connection 208, which can be wired or wireless, can allow the computing device 200 to communicate with other computing devices, locally or remotely, such as over a network protocol (e.g., Ethernet or similar protocols). The connection 208 can further be connected with remote devices associated with other computing devices, such as the sensors system 120 and the data store 115 as described with reference to the vehicle 100.

The computing device 200 can further comprise memory, such as memory 210. The memory 210 can include volatile and/or non-volatile memory. Examples of suitable memory 210 include RAM, flash memory, ROM, EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 210 can be a component of the processor(s) 204, or the memory 210 can be operably connected to the processor(s) 204 for use thereby. The memory 210 can include one or more modules that include computer-readable instructions that, when executed by the processor 204, cause the processor 204 to perform methods and functions that are discussed herein. The memory 210 can include one or more databases or portions thereof. The memory 210 can further contain information related to a reference material for comparison and/or analysis purposes.

The computing device 200 can also include an output 212 for conveying or transmitting output in a fashion which is usable by the vehicle 100, a requesting device, a connected device, a user. In one or more implementations, the output 212 is a video display, a speaker, a projector, an appropriate connection for any of the above devices, or other output devices or connections. In one or more examples, the output 212 can convey output to a screen for convenient viewing (e.g., display device 220) or to a control device. Though the input 202 and the output 212 are presented here as separate elements of the computing device 200, it is understood that, in one or more implementations, the input 202 and the output 212 can be the same device, connection or system, as desired.

The computing device 200 further includes the obstacle prediction system 160 that is implemented to perform methods and other functions as disclosed herein relating to reputation-based device communications. The obstacle prediction system 160 includes a plurality of modules to perform the functions described herein, including a evaluation module 320, an integrity module 330, and a coordination module 340. In one or more implementations, the obstacle prediction system 160 can communicate via a wired or wireless connection, depicted as a network 170, with local or remote devices, such as to receive information regarding the requesting device, connected devices, consulting systems, or others. In one or more implementations, the obstacle prediction system 160 can communicate with the vehicle 100, with a server 172, with another computing device 200, or combinations thereof. Further, the obstacle prediction system 160 can affect communication within the computing device 200, such as between one or more connected devices to correlate registration parameters and functionality as discussed herein. The obstacle prediction system 160 can be in communication with the blockchain database to approve and assign the connection between the one or more requesting devices, the one or more connected devices, and/or the vehicle 100 to provide an established connection, as described herein.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the preceding. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the preceding. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An obstacle prediction system for vehicle-based obstacle prediction, comprising:
   one or more processors; and
   a memory communicably coupled to the one or more processors and storing:
   an evaluation module including instructions that when executed by the one or more processors cause the one or more processors to receive, in a host vehicle, prediction data about an obscured obstacle and including observations from at least one sensor or communications from two or more measured vehicles in a vehicular environment, the obscured obstacle being an obstacle that is located outside of a detection range of one or more sensors of the host vehicle, and establish a trust level for the two or more measured vehicles, the trust level being a measure of a reliability of data or information as received from the two or more measured vehicles, the trust level including historical or behavioral data related to either the two or more measured vehicles or one or more operators of the two or more measured vehicles;

an integrity module including instructions that when executed by the one or more processors cause the one or more processors to in response to predicting the obscured obstacle using the prediction data and the trust level, map the prediction in the vehicular environment; and a coordination module including instructions that when executed by the one or more processors cause the one or more processors to navigate the host vehicle using a guidance input for avoiding the obscured obstacle.

2. The obstacle prediction system of claim 1, wherein the integrity module further comprises instructions that when executed by the one or more processors cause the one or more processors to incorporate successful avoidance data on one or more previous evasive behaviors from the two or more measured vehicles as part of the trust level for the two or more measured vehicles.

3. The obstacle prediction system of claim 1, wherein the prediction data further includes obstacle avoidability of the obscured obstacle, and wherein the coordination module further comprises instructions that when executed by the one or more processors cause the one or more processors to incorporate a lane adjustment or a route adjustment to the guidance input in light of an obstacle avoidability determination.

4. The obstacle prediction system of claim 1, wherein the evaluation module further comprises instructions that when executed by the one or more processors cause the one or more processors to produce a confidence interval for the guidance input using the trust level.

5. The obstacle prediction system of claim 1, wherein the evaluation module further comprises instructions that when executed by the one or more processors cause the one or more processors to weigh the prediction data against the trust level between the two or more measured vehicles to create the prediction of the obscured obstacle.

6. The obstacle prediction system of claim 1, wherein the integrity module further comprises instructions that when executed by the one or more processors cause the one or more processors to determine a time frame that the obscured obstacle is predicted to exist in the vehicular environment.

7. The obstacle prediction system of claim 1, wherein the integrity module further comprises instructions that when executed by the one or more processors cause the one or more processors to determine a set of environmental boundaries around the obscured obstacle in the vehicular environment.

8. The obstacle prediction system of claim 1, wherein the guidance input includes lane-level guidance for avoidance of the obscured obstacle within a current lane for the host vehicle.

9. The obstacle prediction system of claim 1, wherein the coordination module further comprises instructions that when executed by the one or more processors cause the one or more processors to incorporate driver limitations and vehicle limitations to determine corrected evasive behaviors, the corrected evasive behaviors being an adjustment to evasive behaviors performed by the two or more measured vehicles to avoid the obscured obstacle.

10. A non-transitory computer-readable medium for vehicle-based obstacle prediction and storing instructions that when executed by one or more processors cause the one or more processors to:

receive, in a host vehicle, prediction data about an obscured obstacle and including observations from at least one sensor and communications from two or more measured vehicles in a vehicular environment, the obscured obstacle being an obstacle that is located outside of a detection range of one or more sensors of the host vehicle;

establish a trust level for the two or more measured vehicles, the trust level being a measure of a reliability of data or information as received from the two or more measured vehicles, the trust level including historical or behavioral data related to either the two or more measured vehicles or one or more operators of the two or more measured vehicles;

in response to predicting the obscured obstacle using the prediction data and the trust level, map the prediction in the vehicular environment; and navigate the host vehicle using a guidance input for avoiding the obscured obstacle.

11. The non-transitory computer-readable medium of claim 10, further comprising instructions that when executed by the one or more processors cause the one or more processors to incorporate driver limitations and vehicle limitations to determine corrected evasive behaviors, the corrected evasive behaviors being an adjustment to evasive behaviors performed by the two or more measured vehicles to avoid the obscured obstacle.

12. The non-transitory computer-readable medium of claim 10, further comprising instructions that when executed by the one or more processors cause the one or more processors to produce a confidence interval for the guidance input using the trust level.

13. The non-transitory computer-readable medium of claim 10, further comprising instructions that when executed by the one or more processors cause the one or more processors to weigh the prediction data against the trust level between the two or more measured vehicles to create the prediction of the obscured obstacle.

14. The non-transitory computer-readable medium of claim 10, further comprising instructions that when executed by the one or more processors cause the one or more processors to determine a time frame that the obscured obstacle is predicted to exist in the vehicular environment.

15. The non-transitory computer-readable medium of claim 10, further comprising instructions that when executed by the one or more processors cause the one or more processors to incorporate a lane adjustment or a route adjustment to the guidance input in light of an obstacle avoidability determination.

16. The non-transitory computer-readable medium of claim 10, further comprising instructions that when executed by the one or more processors cause the one or more processors to determine a set of environmental boundaries around the obscured obstacle in the vehicular environment.

17. A method for vehicle-based obstacle prediction, comprising:

receiving, in a host vehicle, prediction data about an obscured obstacle and including observations from at least one sensor and communications from two or more measured vehicles in a vehicular environment, the obscured obstacle being an obstacle that is located outside of a detection range of one or more sensors of the host vehicle;

establishing a trust level for at least one of the two or more measured vehicles, the trust level being a measure of a reliability of data or information as received from the two or more measured vehicles, the trust level including historical or behavioral data related to either the two or more measured vehicles or one or more operators of the two or more measured vehicles;

in response to predicting the obscured obstacle using the prediction data and the trust level, mapping the obscured obstacle in the vehicular environment; and navigating the host vehicle using a guidance input for avoiding the obscured obstacle.

18. The method of claim 17, further comprising incorporating success data on one or more previous evasive behaviors from the two or more measured vehicles as part of the trust level for the two or more measured vehicles.

19. The method of claim 17, further comprising weighing the prediction data against the trust level between the two or more measured vehicles to create the prediction of the obscured obstacle.

20. The method of claim 17, further comprising determining a time frame that the obscured obstacle is predicted to exist in the vehicular environment.

21. The obstacle prediction system of claim 1, wherein the prediction data includes sensor data of an evasive behavior from a measured vehicle and/or direct reporting of an evasive behavior from a measured vehicle.

\* \* \* \* \*